US009854210B2

(12) United States Patent
Herrli Anderegg et al.

(10) Patent No.: US 9,854,210 B2
(45) Date of Patent: Dec. 26, 2017

(54) METHOD AND DEVICE FOR MONITORING A MONITORING REGION

(71) Applicant: XOVIS AG, Zollikofen (CH)

(72) Inventors: Markus Herrli Anderegg, Allmendingen b. Bern (CH); Jonas Hagen, Richigen (CH); David Studer, Bruegg BE (CH); Martin Wuethrich, Bruegg BE (CH)

(73) Assignee: Xovis AG, Zollikofen (CH)

( * ) Notice: Subject to any disclaimer, the term of this patent is extended or adjusted under 35 U.S.C. 154(b) by 586 days.

(21) Appl. No.: 14/361,440

(22) PCT Filed: Nov. 23, 2012

(86) PCT No.: PCT/CH2012/000261
§ 371 (c)(1),
(2) Date: May 29, 2014

(87) PCT Pub. No.: WO2013/078568
PCT Pub. Date: Jun. 6, 2013

(65) Prior Publication Data
US 2014/0327780 A1    Nov. 6, 2014

(30) Foreign Application Priority Data
Nov. 29, 2011    (EP) .................................... 11405363

(51) Int. Cl.
*H04N 7/00* (2011.01)
*H04N 7/18* (2006.01)
(Continued)

(52) U.S. Cl.
CPC ......... *H04N 7/181* (2013.01); *G06K 9/00771* (2013.01); *G08B 13/19641* (2013.01); *G08B 13/19645* (2013.01); *G08B 13/19608* (2013.01)

(58) Field of Classification Search
CPC ............... H04N 7/181; G06K 9/00771; G08B 13/19641
(Continued)

(56) References Cited

U.S. PATENT DOCUMENTS 7,149,325 B2    12/2006 Pavlidis et al.
7,286,157 B2    10/2007 Buehler
(Continued)

FOREIGN PATENT DOCUMENTS

EP    1676239    8/2010
WO    2004045215    5/2004
(Continued)

OTHER PUBLICATIONS

Ting-Hsun Chang et al.: "Tracking Multiple People with a Multi-Camera System", Multi-Object Tracking, 2001. Proceedings. 2001 IEEE Workshop on July 8, 2001. Piscataway, NJ, USA, IEEE, Jan. 1, 2001 (Jan. 1, 2001), pp. 19-26, XP010554350.

*Primary Examiner* — Jeffery Williams
(74) *Attorney, Agent, or Firm* — Jacox, Meckstroth & Jenkins

(57) ABSTRACT

A method and a device for monitoring a monitoring region with at least two image sensors. A sub-region of the monitoring region is monitored by each of the image sensors, wherein each image sensor detects objects to be monitored that are located within the sub-region monitored by said image sensor, and each image sensor outputs data relating to the detected objects and are disposed and oriented in such a way that the monitored sub-regions overlap and that each object to be monitored that is located in the monitoring region is always detected by at least one image sensor.

3 Claims, 3 Drawing Sheets

Figure 1:
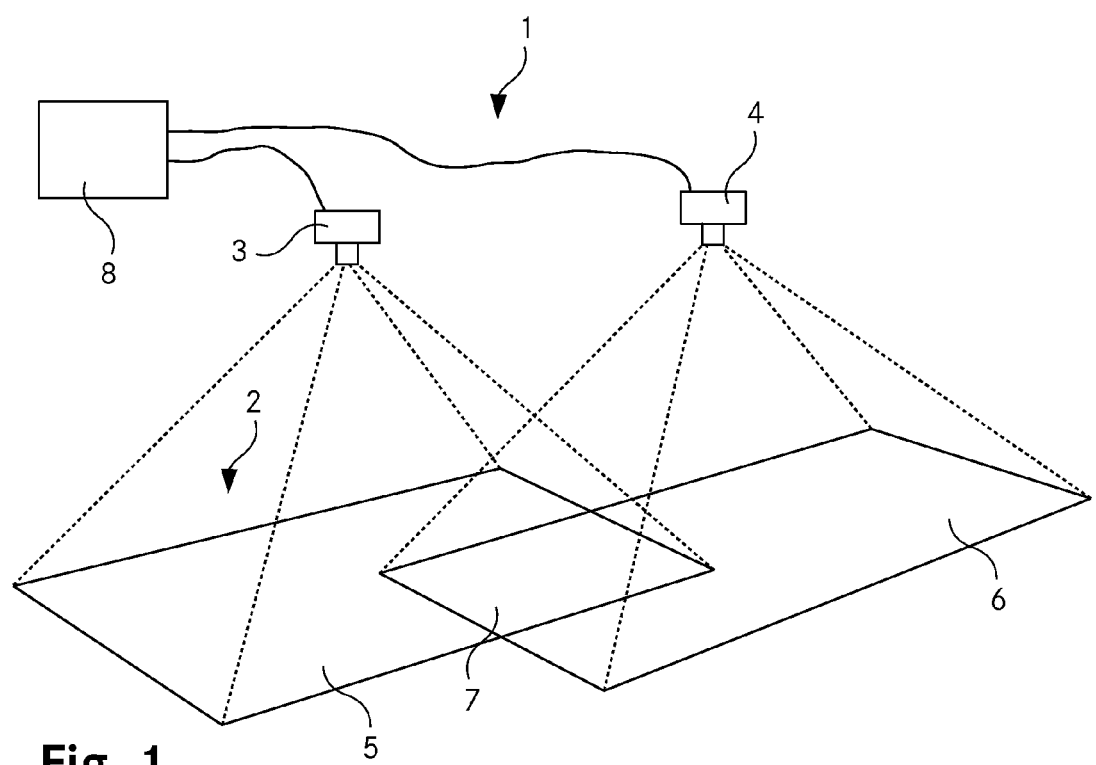

(51) Int. Cl.
*G06K 9/00* (2006.01)
*G08B 13/196* (2006.01)

(58) Field of Classification Search
USPC .......................................................... 348/159
See application file for complete search history.

(56) References Cited

U.S. PATENT DOCUMENTS

| | | |
|---|---|---|
| 7,346,187 B2 | 3/2008 | Buehler |
| 7,418,113 B2 | 8/2008 | Porikli et al. |
| 7,529,388 B2 | 5/2009 | Brown et al. |
| 7,558,762 B2 | 7/2009 | Owechko et al. |
| 7,924,311 B2 | 4/2011 | Yoshida et al. |
| 8,098,891 B2 | 1/2012 | Lv et al. |
| 8,116,564 B2 | 2/2012 | Kilambi et al. |
| 8,253,797 B1* | 8/2012 | Maali ............... G06T 7/0042 345/419 |
| 8,547,437 B2 | 10/2013 | Buehler et al. |
| 8,666,110 B2 | 3/2014 | Yoo et al. |
| 2004/0130620 A1 | 7/2004 | Buehler et al. |
| 2005/0012817 A1* | 1/2005 | Hampapur ............ H04N 7/185 348/143 |
| 2005/0058321 A1 | 3/2005 | Buehler |
| 2005/0078852 A1 | 4/2005 | Buehler |
| 2005/0265582 A1 | 12/2005 | Buehler et al. |
| 2006/0222205 A1 | 10/2006 | Porikli et al. |
| 2007/0183669 A1* | 8/2007 | Owechko ........... G06K 9/00369 382/224 |
| 2008/0118106 A1 | 5/2008 | Kilambi et al. |
| 2008/0225121 A1 | 9/2008 | Yoshida et al. |
| 2008/0281553 A1* | 11/2008 | Frank ................ A63B 24/0021 702/150 |
| 2009/0296985 A1 | 12/2009 | Lv et al. |
| 2011/0150327 A1 | 6/2011 | Yoo et al. |

FOREIGN PATENT DOCUMENTS

| | | |
|---|---|---|
| WO | 2005027533 | 3/2005 |
| WO | 2009070560 | 6/2009 |

\* cited by examiner

METHOD AND DEVICE FOR MONITORING A MONITORING REGION

CROSS-REFERENCE TO RELATED APPLICATIONS

This application claims priority to European Application No. 11405363.0 filed Nov. 29, 2011 and to PCT Application No. PCT/CH2012/000261 filed Nov. 23, 2012, all of which are incorporated herein by reference and made a part hereof.

BACKGROUND OF THE INVENTION

1. Field of the Invention

The invention relates to a method and a device for monitoring a monitoring region with at least two image sensors. A sub-region of the monitoring region is monitored by each of the image sensors by virtue of the fact that each image sensor detects objects to be monitored that are localized within the sub-region monitored by the image sensor and data concerning the detected objects are output by each image sensor. The image sensors are arranged and oriented in such a way that the monitored sub-regions overlap and that each object to be monitored which is situated in the monitoring region is always detected by at least one image sensor. A totality of the objects to be monitored in the monitoring region is determined from the data of the image sensors.

2. Description of the Related Art

Various methods and devices are known which belong to the prior art mentioned above. One example thereof is the computer-aided video monitoring system described in WO 2005/027533 in the name of Intellivid Corp., which is equivalent to U.S. Patent Application No. 2005/0058321 and to U.S. Pat. No. 7,286,157, which system can monitor different sub-regions with different cameras. Each of the sub-regions is subdivided into subdivided regions and the detected objects are counted in each subdivided region. A probability that subdivided regions which are monitored by different cameras correspond is determined on the basis of the statistics about the presence of objects in the subdivided regions. As a result, objects which are situated in such subdivided regions can be assigned to one another.

A similar procedure is described in EP 1 676 239 B1 in the name of Sensormatic Electronics, which is equivalent to U.S. Patent Application No. 2005/0078852 and to U.S. Pat. No. 7,346,187. In that case, too, different sub-regions are monitored with different cameras, wherein each sub-region is subdivided into subdivided regions and the detected objects are counted in each subdivided region. It is taken into account that objects can be situated in overlapping fields of view of a plurality of cameras. For this purpose, a central computer has information about the overlapping subdivided regions that is obtained on the basis of correlations between images of the cameras or is explicitly predefined. Objects which are situated in such subdivided regions are assigned to one another. In order to improve this assignment, it is possible to use features of the objects such as their color, for example.

The disadvantage of the systems described in WO 2005/027533 in the name of Intellivid Corp., which is equivalent to U.S. Patent Application No. 2005/0058321 and to U.S. Pat. No. 7,286,157 and in EP 1 676 239 B1 in the name of Sensormatic Electronics, which is equivalent to U.S. Patent Application No. 2005/0078852 and to U.S. Pat. No. 7,346,187, is that the assignment of the objects is primarily effected by means of an assignment of the overlapping subdivided regions. Firstly, this can have the effect that subdivided regions chosen to be too large lead to inaccuracies because a plurality of objects can be situated in such a subdivided region. Secondly, this has the effect that incorrect assignments can occur upon the transition of an object from one subdivided region into another subdivided region within a sub-region monitored by a camera.

A somewhat different approach is described by Honeywell in U.S. Pat. No. 7,149,325 B2, where the fields of view of a plurality of cameras are combined to form a common, superordinate image. For this purpose, homography matrixes are formed by distinguished points in the overlapping regions being brought to correspondence. In this case, the images recorded by the cameras are rectified for the combination to form the superordinate image. Foreground objects, such as moving persons, for example, are modeled as pixel accumulations and tracked in terms of their movement. One important feature used for identifying persons is a color signature.

The disadvantage of this approach is that the images of the cameras have to be combined in a first step. If the cameras in this case are video cameras, the image sequences of the different cameras have to be synchronized in order to be able to combine the corresponding sequences of the superordinate images. This results in the installation of the cameras being made more expensive.

Instead of the modeling of the persons as pixel accumulations as described by Honeywell in U.S. Pat. No. 7,149,325 B2, other types of modeling can also be applied. One such example is described by Kilambi et al. in US 2008/118106 A1, where groups of persons are modeled as elliptic cylinders. These cylinders are used for subsequent calculations, in particular for determining the number of persons in the group.

A further possibility for the modeling of persons is described by Brown et al. in U.S. Pat. No. 7,529,388 B2, where the individual persons are modeled as ellipses.

SUMMARY OF THE INVENTION

The problem addressed by the invention is that of providing a method associated with the technical field mentioned in the introduction and a corresponding device which enable an improved determination of the totality of the objects to be monitored in the monitoring region from the data of the image sensors.

The solution to the problem is defined by the features of claim 1. In accordance with the method according to the invention, on the basis of the data of the image sensors the objects to be monitored in overlapping sub-regions which are detected by more than one image sensor are assigned to one another by means of a rating of their correspondence in order to determine the totality of the objects to be monitored in the monitoring region. In accordance with the device according to the invention, by means of a calculation unit on the basis of the data of the image sensors the objects to be monitored in overlapping sub-regions which are detected by more than one image sensor can be assigned to one another by means of rating of their correspondence in order to determine the totality of the objects to be monitored in the monitoring region. In this case, the calculation unit can be embodied as a separate unit or can be integrated into one of the at least two image sensors. In this case, however, there is also the possibility that more than one or all of the at least two image sensors comprise such a calculation unit.

The image sensors used for this purpose can be any arbitrary type of image sensor. By way of example, cameras which only occasionally capture an image can be involved. The capture of an image can be triggered in each case by a motion sensor. However, there is also the possibility that the image sensors capture images at regular intervals. Between the individual images there can be time intervals of any arbitrary length. However, these intervals can also be arbitrarily short. In the latter case, the image sensors can be for example cameras which record film sequences. Independently of whether the image sensors record individual images or film sequences, the image sensors can be cameras which record optical images in the visible range. However, any other arbitrary type of camera can also be involved. By way of example, the image sensors can also be infrared cameras, ultraviolet cameras or other cameras which are available per se and which record images of electromagnetic radiation of any other arbitrary wavelength or in any other arbitrary wavelength range. Furthermore, the image sensors can for example also be cameras which record acoustic or ultrasound images. However, there is also the possibility that the image sensors are laser sensors.

Independently of the type of image sensors, there is the possibility that some or each of the image sensors comprises two sensors. A detection of the three-dimensional space can be possible by means of such an image sensor. By way of example, such an image sensor can be an image sensor having two cameras arranged alongside one another. By virtue of the stereoscopic image captured by the two cameras, by way of example, not only is it possible to detect a position of an object in an image plane, but it is also possible to determine a position of an object in a depth perpendicular to the image plane. However, the invention can expressly also be realized without any stereoscopic images being captured. However, there is also the possibility that the image sensors are sensors which enable a detection of the three-dimensional space. By way of example, 3D laser sensors can be involved which scan the space and in this case can also detect a distance between the objects to be monitored and the respective 3D laser sensor.

In the same way as different image sensors can be used, different objects can also be monitored. By way of example, the objects to be monitored can be persons. In this case, by way of example, it is possible to distinguish between adults and children. Furthermore, however, the objects to be monitored can also be animals, for example. In this case, it is likewise possible to distinguish between different animal sizes. However, there is also the possibility that the objects to be monitored are vehicles or other moving articles. In this case, it is possible to distinguish between trucks, cars and motorcycles, for example. Depending on the location of use and objects to be monitored, it is possible to use different image sensors which are optimized for the corresponding use. In this case, by way of example, the lighting conditions can also be taken into account for a choice of the image sensors.

The totality of the objects to be monitored that is determined from the data of the image sensors relates to the objects to be monitored which are situated in the entire monitoring region. In this case, this totality of the objects to be monitored can comprise only a number of the objects detected overall or else an identification for each object to be monitored. However, there is also the possibility that the totality of the objects to be monitored comprises further data concerning each of the objects. By way of example, the further data can comprise the positions of the objects. By way of example, however, the further data can also comprise the velocities of the objects. Furthermore, there is also the possibility that the further data encompass a movement progression of the objects. If the totality of the objects to be monitored comprises further data besides the identification, then the further data can be presented for example as a list. In this case, the individual objects can be identified on the basis of their position in the list, as a result of which a separate identification of the objects is unnecessary.

The rating of the correspondence that is used for the assignment of the objects to be monitored in overlapping sub-regions can be effected in various ways. By way of example, a positive rating can be involved. In this case, the correspondence of objects which is more probable is rated with higher values, while the correspondence of objects which is less probable is rated with lower values. In this case, there is also the possibility that the individual ratings are normalized with respect to probabilities. As a variant in this regard, however, the rating of the correspondence can also be a negative rating (cost rating), in which the correspondence of objects which is more probable is rated with lower values, while the correspondence of objects which is less probable are rated with higher values. As a further variant, however, there is also the possibility that a specific rating value represents a highest probability of a correspondence. In this case, both rating values thereabove and rating values therebelow can represent a lower probability of a correspondence. As a result, rating values thereabove and therebelow can represent for example a statement about a type of rating used or about rating criteria used.

The solution of the invention has the advantage that the reliability of the assignment of the objects is increased by the rating of the correspondence. Accordingly, improved monitoring of the monitoring region is ensured. Moreover, the method and the device are suitable for tracking persons and for counting persons and function with cross-sensor or cross-camera overlap.

Preferably, each object to be monitored which is situated in the monitoring region is always completely detected by at least one image sensor. This has the advantage that the reliability of the assignment is increased because the assignment of the objects detected by different image sensors is effected only for completely detected objects. As an alternative thereto, however, there is also the possibility that the objects to be monitored are not always completely detected by at least one image sensor. This can be advantageous in order also to detect edge regions of the monitoring region and in order to reduce a number of the image sensors required.

Preferably, a matrix is established in each case for the assignment of the objects to be monitored in overlapping sub-regions, the elements p_ij of the matrix containing the rating of how well an object with identification i detected by one image sensor corresponds to an object with identification j detected by another image sensor. In this case, there is the possibility that the indexes i and j proceed over all objects to be monitored which are situated in the sub-region monitored by the corresponding image sensor. However, there is also the possibility that the indexes i and j proceed only over those objects which are situated in an overlap region of the two sub-regions and are detected by the corresponding image sensor.

If three or more sub-regions which are monitored by a corresponding number of image sensors mutually overlap, then there is the possibility that an assignment of the objects to be monitored in two of the sub-regions is performed in a first step. An assignment of the objects to be monitored in the sub-regions already processed and of the objects to be monitored in a further sub-region can then be performed in a further step. This further step can be repeated until all overlapping sub-regions are processed.

In the case of three or more overlapping sub-regions, in one variant, however, the matrix established can also be more than two-dimensional. By way of example, the matrix can comprise the same number of dimensions as the number of overlapping sub-regions. The number of indexes of the matrix elements $p\_ij$ should be adapted accordingly. In this case, the indexes can once again proceed over all objects to be monitored in the corresponding sub-region or else proceed only over those objects which are situated within an overlap region of the sub-regions.

It is possible to determine only ratings for correspondences for which there is at least a certain probability of a correspondence. That is to say that no elements represent the non-rated correspondences. Memory space and calculation time can accordingly be saved as a result.

Preferably, for each combination of possibly corresponding objects a sum of the ratings of the objects which correspond in the case of this combination is formed. Preferably, in this case, the assignment of the objects to be monitored is effected by a choice of the combination which produces an extreme of the sum. In this case, there is the possibility that the sum of the ratings is maximized. This is advantageous if a high rating value represents a high probability of a correspondence, while a low rating value represents a low probability of a correspondence. However, the sum can also be minimized. This is advantageous if a low rating value represents a high probability of a correspondence, while a high rating value represents a low probability of a correspondence. Both a maximization of the sum and a minimization of the sum have the advantage that an optimum assignment of the objects to be monitored can be achieved in a simple manner.

If a specific rating value represents a highest probability of a correspondence and both rating values thereabove and rating values therebelow represent a lower probability of a correspondence, then as a variant it is possible for example to form a sum of the differences between the rating value with the highest probability and the rating values of the objects which correspond in the case of this combination. In this case, the assignment of the objects to be monitored can be achieved by a choice of the combination with an extreme of this sum of the differences.

As a variant with respect to these embodiments which provide for forming a sum, it is also possible for example to form a sum of function values of the rating values or of the differences. As the function, for example, it is possible to square the rating values or the differences before summation or it is possible in each case to find the square root of the rating values or differences. However, there is also the possibility of calculating the summands from the rating values or differences by means of any other formula or function. Depending on the specific embodiment, the use of such a formula or function can be advantageous since a stabler and more reliable algorithm for the assignment of the objects to be monitored can be achieved as a result.

As an alternative to these variants, however, the assignment of the objects to be monitored can also be effected differently than by forming a sum of the rating values.

Advantageously, in the rating of the correspondence of objects to be monitored, concomitant consideration is given to the fact that the objects to be monitored can also be detected only by one image sensor. The fact that an object to be monitored can be detected only by one image sensor can stem for example from the fact that an object to be monitored is situated at a position monitored only by one image sensor. However, it can also stem from the fact that although an object to be monitored is situated in an overlap region of two or more sub-regions, it is detected only by one image sensor. In both cases, concomitant consideration of the fact that the objects to be monitored can also be detected only by one image sensor has the advantage that an improved assignment of the objects to be monitored is achieved.

If a matrix is established in each case for the assignment of the objects to be monitored in overlapping sub-regions, such concomitant consideration can be implemented, for example, by adding in the matrix a column or a row whose elements contain the rating that there is no correspondence to an object to be monitored in the sub-region which is represented by the columns or respectively rows.

As a variant with respect thereto, there is also the possibility that for the rating of the correspondences of the objects to be monitored it is assumed that each object is detected by at least two image sensors. This variant can be advantageous if an assignment is effected only for objects to be monitored which are situated in an overlap region of two or more sub-regions. As a result, the assignment can be effected more rapidly.

Preferably, non-assigned objects are included as separate objects in the totality of the objects to be monitored. This has the advantage that objects which cannot be assigned or which can be assigned only with low probability are also concomitantly included in the totality of the objects to be monitored. A more complete and better determination of the totality of the objects to be monitored is made possible as a result.

As an alternative thereto, however, there is also the possibility that non-assigned objects are not concomitantly included in the totality of the objects to be monitored.

Preferably, the data output by the image sensors are output in an anonymized fashion. As a result, the data concerning the totality of the objects to be monitored can be processed further, in which case data protection regulations can be complied with, without the need to take special precautions in order to specially protect the further data processing. The anonymization consists, in particular, in the fact that the image sensors output no data whatsoever which might directly or indirectly allow the identity of monitored persons to be inferred. By way of example, the acquired image data are not output, but nor are any indications about detected colors and/or body dimensions of the monitored persons.

As an alternative thereto, however, there is also the possibility that the data output by the image sensors are not output in an anonymized fashion.

Preferably, in the data output by the image sensors each detected object is represented by a parameterized model. In this case, there is the possibility that such a parameterized model consists solely of a position of the detected object or of a ray which, proceeding from the corresponding image sensor, passes through the object respectively detected. This has the advantage that as a result of the parameterization of the models anonymized data about the objects to be monitored can be output. Furthermore, however, there is also the possibility that a parameterized model is also of more complex construction. By way of example, as a result, a size, a shape or an orientation of the objects to be monitored can be characterized by the parameters. This has the advantage that, despite such parameters being output, the data concerning the detected objects can be anonymized.

As a variant with respect thereto, however, there is also the possibility that, in the data output by the image sensors, the detected objects are not represented by a parameterized model.

If in the data output by the image sensors each detected object is represented by a parameterized model, then preferably a value calculated from a minimum distance between a ray proceeding from one image sensor through a centroid of the parameterized model and a ray proceeding from another image sensor through a centroid of the parameterized model is in each case taken into account for the rating of the correspondence. In this case, the centroid of the parameterized model is a reference point of the respective object to be monitored, which reference point in the present document is also designated as a centroid of an object. The use of this term does not mean that the physical centroid of the object is involved. Although the point can be situated at the location of the physical centroid of an object, it can also be arranged elsewhere in or around the object. The exact arrangement of such a centroid can be determinable for example on the basis of the parameters output by the corresponding image sensor and on the basis of the parameterized model used. However, the centroid can for example also be determinable directly in the corresponding image sensor on the basis of the parameterized model used, wherein the image sensors in each case output only data concerning the ray proceeding from the respective image sensor through the centroid of the corresponding object. Accordingly, the arrangement of the centroid in the parameterized model or in the object to be monitored is model-dependent. Moreover, the centroid can be determined differently on the basis of the parameters. By way of example, a geometrical center of the parameterized model can be involved. However, a different point in or around the parameterized model can also be involved. If the parameterized model is an ellipse, for example, then the centroid can be a midpoint of the ellipse, for example. If the object to be monitored is a person, then the position of the feet or of the head of the person to be monitored can also be involved, for example, which is determined on the basis of the parameters of the parameterized model.

If in the data output by the image sensors each detected object is represented by a parameterized model, then preferably for each object to be monitored in the totality of the objects to be monitored a height of the centroid of the corresponding object is stored, wherein initially an expedient height is assumed as a value of the height and the value of the height is dynamically adapted by virtue of the fact that upon each assignment of objects to be monitored, in which the corresponding object to be monitored is detected by at least two image sensors, a height of the centroid of the object is determined by virtue of the fact that a height of a midpoint of a shortest connecting line between a ray proceeding from one image sensor through the centroid of the parameterized model detected by the image sensor and a ray proceeding from the other image sensor through the centroid of the parameterized model detected by the image sensor is determined. In this case, the value of the height can be adapted for example dynamically in each case to the last value determined. However, there is also the possibility that the value of the height is adapted in each case dynamically to an average value of the previously determined values of the height. Both have the advantage that the positions of the objects to be monitored in the totality of the objects to be monitored can be determined more precisely by virtue of the fact that in each case a ray proceeding from the corresponding image sensor through the centroid of the parameterized model detected by the image sensor can be used, wherein the position of the respective object corresponds to the point of intersection of the ray with a height of the centroid of the corresponding object above the ground of the corresponding sub-region.

However, there is also the possibility that no height of the centroid of the objects to be detected is determined and stored or dynamically adapted.

If in the data output by the image sensors each detected object is represented by a parameterized model, then preferably the rating of the correspondence takes account of whether a midpoint of a shortest connecting line between the ray proceeding from one image sensor through the centroid of the parameterized model detected by the image sensor and the ray proceeding from the other image sensor through the centroid of the parameterized model detected by the image sensor is situated at an expedient height for a height of a centroid of the objects to be monitored. In this case, there is the possibility of predefining a fixed range for an expedient height. However, there is also the possibility that a range around a stored and dynamically adapted value of the height of the centroid of the corresponding object is used for the determination of an expedient height. Both have the advantage that the rating takes account of how plausible the correspondence of two objects is on the basis of the height of the centroid. The use of a fixed range for an expedient height has the advantage, moreover, that the objects to be monitored can be selected according to the height of their centroid.

As a variant with respect thereto, there is also the possibility that no height of the midpoint of the shortest connecting line between the ray proceeding from one image sensor through the centroid of the parameterized model detected by the image sensor and the ray proceeding from the other image sensor through the centroid of the parameterized model detected by the image sensor is taken into account in the rating of the correspondence. This is advantageous if selection of the objects to be monitored according to the height of their centroid is not intended to take place. This may be the case, for example, if the objects to be monitored comprise both adults and children of different ages and, if appropriate, animals such as dogs or cats, for example.

If in the data output by the image sensors each detected object is represented by a parameterized model, then preferably a similarity of the parameterized models of the objects to be monitored is taken into account for the rating of the correspondence. In this case, there is the possibility that the parameters which are output by the different image sensors with respect to the modeled objects are compared directly. However, there is also the possibility that for example a position of the models output by the image sensors in the space is compared, wherein an orientation and a positioning of the image sensors are taken into account. If, for the detected objects to be monitored, a value for the height of their centroid is stored and possibly dynamically adapted, it is possible to determine for example the position of the respective object by means of the point of intersection of the ray proceeding from the corresponding image sensor through the centroid of the object with a height of the centroid of the corresponding object above the ground of the corresponding sub-region, wherein the positions of the objects determined in this way on the basis of the data output by the different image sensors are compared with one another. Furthermore, however, there is also the possibility that in the image sensors, for example, the detected objects are modeled with a three-dimensional model such as, for example, an ellipsoid, a cylinder or a rectangular block. In this case, there is the possibility, for example, that the data output by the image sensors do not contain parameters of the three-dimensional model, rather that the data output by the image sensors contain parameters of a two-dimensional model representing a projection of the three-dimensional model onto a two-dimensional area, wherein the two-dimensional area corresponds to a modeling of the monitored sub-regions. In this case, the data output by the image sensors can be for example parameters concerning an ellipse, a rectangle or some other geometrical shape. If, in this example, the similarity of the parameterized models of the objects to be monitored is taken into account for the rating of the correspondence, then it is possible for example to take account of an orientation and a positioning of the image sensors and also the fact that the parameters output are parameters of a model which corresponds to a projection.

As an alternative thereto, there is also the possibility that a similarity of the parameterized models of the objects to be monitored is not taken into account for the rating of the correspondence.

Advantageously, velocities and directions of movement—detected by the image sensors—of the objects to be monitored are taken into account for the rating of the correspondence. This has the advantage that objects which evidently do not correspond not on account of different movement can be rated accordingly on the basis of their movement behavior and be kept away from an assignment.

As a variant with respect thereto, there is also the possibility that only either velocities or directions of movement—detected by the image sensors—of the objects to be monitored are taken into account for the rating of the correspondence. This likewise has the advantage that objects which do not correspond can be rated accordingly on the basis of their movement behavior and be kept away from an assignment.

As an alternative thereto, however, there is also the possibility that neither velocities nor directions of movement—detected by the image sensors—of the objects to be monitored are taken into account for the rating of the correspondence.

Preferably, assignments of the objects to be monitored that were effected earlier are taken into account for the rating of the correspondence. This has the advantage that a consistency of the assignments of the objects to be monitored can be achieved over a period of time. This is advantageous particularly if the image sensors supply data concerning the detected objects at short time intervals. By way of example, this may be the case if the image sensors are cameras which record film sequences.

As an alternative thereto, however, there is also the possibility that assignments of the objects to be monitored that were effected earlier are not taken into account for the rating of the correspondence. Such an alternative is advisable for example if the image sensors supply data concerning the detected objects at time intervals and the objects to be monitored may have moved over considerable distances in each case in the meantime.

Preferably, a plurality of the rating criteria mentioned above are used for the rating of the correspondence. In this case, the different rating criteria can be weighted with different strengths. This has the advantage that an optimum rating of the correspondence can be achieved for different types of objects to be monitored and different situations in which the objects are intended to be monitored.

As a preferred variant with respect thereto, however, there is also the possibility that only one of the rating criteria mentioned above is used for the rating of the correspondence. An optimum rating of the correspondence can likewise be achieved as a result, depending on objects to be monitored and depending on situations in which the objects are intended to be monitored.

As an alternative thereto, however, there is also the possibility that one or a plurality of other rating criteria such as, for example, a color of the objects to be monitored or some other identification of the objects that is detected by the image sensors are used as a rating criterion for the rating of the correspondence. In this case, there is also the possibility that such other rating criteria are used together with the rating criteria mentioned above for rating the correspondence.

Furthermore, there is the possibility that for the assignment of the objects in different regions within the monitoring region, use is made of different rating criteria or different combinations of rating criteria for the rating of the correspondence. This can be advantageous for example if the lighting conditions vary greatly within the monitoring region. It may then be expedient for example, in a rather dark region, for the velocity of the objects to be monitored to be weighted more heavily than a size of the objects, since an estimation of the size of the objects is less accurate on account of the lighting conditions. At the same time, in a brighter region, a size of the objects can be weighted comparatively more heavily for the rating of the correspondence.

Preferably, the monitoring region is modeled as a two-dimensional area with a two-dimensional coordinate system, wherein each of the objects to be monitored in the totality of the objects to be monitored is characterized by data relating to said coordinate system. In this case, the characterizing data can contain for example an identification of the corresponding object. However, the data can for example also include indications about a position, a velocity, a movement course or the like of the corresponding object. This has the advantage that a local assignment of the individual objects is made possible.

As a variant with respect thereto, there is also the possibility that the monitoring region is modeled as a three-dimensional space with a three-dimensional coordinate system, wherein each of the objects in the totality of the objects to be monitored is characterized by data relating to the coordinate system. In this case, the characterizing data can contain for example an identification of the corresponding object. However, the data can for example also include indications about a position, a velocity, a movement course or the like of the corresponding object. This variant likewise has the advantage that a local assignment of the individual objects is made possible.

As a further variant with respect thereto, there is also the possibility that the monitoring region is modeled as a one-dimensional space or as a line with a one-dimensional coordinate system, wherein each of the objects in the totality of the objects to be monitored is characterized by data relating to this coordinate system. This is advantageous for example if the monitoring region has an elongate form and objects can move only along this elongate form. By way of example, such a monitoring region can be a road, a corridor, a moving sidewalk or some other, laterally delimited, elongate space. It goes without saying, however, that a road, a corridor or a moving sidewalk can also be modeled as a two- or three-dimensional space. This last can be advantageous if for example vehicles on the road or persons or animals in the corridor or on the moving sidewalk can mutually overtake one another or their paths can cross one another.

If a movement course of the objects is intended to be recorded, then there is the possibility, moreover, that the monitoring region is modeled as a one-, two- or three-dimensional space with an additional time dimension.

As an alternative thereto, however, there is also the possibility that the monitoring region is not modeled as a one-, two- or three-dimensional space. Such an alternative can be advantageous if the intention is to determine for example just a number of the objects to be monitored in the monitoring region. In this case, no data concerning the position of the objects are required, as a result of which less calculation capacity is required as well. In this case, however, it is also possible for example for the monitoring region to be modeled only by a time dimension, in order to determine a change in the number of objects to be monitored in the monitoring region over time.

Preferably, each sub-region monitored by an image sensor is modeled as a two-dimensional area with a two-dimensional coordinate system, wherein the data concerning the detected objects that are output by each image sensor relate to the coordinate system of the sub-region monitored by the image sensor. In this case, the data output by the image sensors can contain for example an identification of the corresponding object. By way of example, the data can also include, however, indications about a position, a velocity, a movement course or the like of the corresponding object. By way of example, the data output can also include, however, indications about a size or other characteristics of the object. This has the advantage that a local assignment of the individual objects is made possible, and that, if appropriate, certain features of the objects to be monitored are detectable.

As a variant with respect thereto, there is also the possibility that each sub-region monitored by an image sensor is modeled as a three-dimensional space with a three-dimensional coordinate system, wherein the data concerning the detected objects that are output by each image sensor relate to the coordinate system of the sub-region monitored by the image sensor. In this case, the data output by the image sensors can contain for example an identification of the corresponding object. By way of example, the data can also include, however, indications about a position, a velocity, a movement course or the like of the corresponding object. By way of example, the data output can also include, however, indications about a size or other characteristics of the object. This variant likewise has the advantage that a local assignment of the individual objects is made possible, and that, if appropriate, certain features of the objects to be monitored are detectable.

As a further variant with respect thereto, there is also the possibility that each sub-region monitored by an image sensor is modeled as a one-dimensional space or as a line with a one-dimensional coordinate system, wherein the data concerning the detected objects that are output by each image sensor relate to the coordinate system of the sub-region monitored by the image sensor. This is advantageous for example if the corresponding sub-region has an elongate form and objects can move only along this elongate form. By way of example, such a sub-region can be a road, a corridor, a moving sidewalk or some other, laterally delimited, elongate space. It goes without saying, however, that a road or a moving sidewalk can also be modeled as a two- or three-dimensional space. This last can be advantageous if for example vehicles on the road or persons or animals in the corridor or on the moving sidewalk can mutually overtake one another or their paths can cross one another.

If a movement course of the objects is intended to be recorded, then there is the possibility, moreover, that each sub-region monitored by an image sensor is modeled as a one-, two- or three-dimensional space with an additional time dimension.

As an alternative thereto, however, there is also the possibility that not every sub-region monitored by an image sensor is modeled as a one-, two- or three-dimensional space. By way of example, each sub-region monitored by an image sensor can be modeled as a different-dimensional space. Moreover, there is the possibility of modeling one, a plurality or all of the monitored sub-regions as more than three-dimensional spaces.

Advantageously, the data output by the image sensors comprise an identification and X- and Y-coordinates concerning each of the detected objects to be monitored. In one preferred variant, the data output by the image sensors comprise a velocity vector, moreover, concerning each of the detected objects to be monitored.

As an alternative thereto, however, there is also the possibility that the data output by the image sensors comprise other data for each of the detected objects to be monitored.

If the sub-regions monitored by the image sensors are modeled as two-dimensional areas with a two-dimensional coordinate system, then advantageously the objects detected by the image sensors are modeled as ellipsoids whose projection onto the two-dimensional area of the corresponding sub-region produce an ellipse, wherein the data concerning each of the detected objects to be monitored that are output by the image sensors comprise an identification, X- and Y-coordinates of a midpoint of the ellipse, sizes of the major axes of the ellipse, an orientation angle of the ellipse and a velocity vector. This has the advantage that the data output by the image sensors are sufficiently anonymized. At the same time, however, the data output by the image sensors enable the differentiation of the objects and also positioning and monitoring of the velocity of the objects. Furthermore, these data output have the advantage that they allow an estimation of a size and of a position of the objects to be monitored in the space.

As a variant with respect thereto, there is also the possibility that the objects detected by the image sensors are modeled differently. By way of example, the objects can be modeled directly as ellipses. However, there is also the possibility that the objects are not modeled as ellipsoids, but rather for example as cylinders or rectangular blocks. Equally, however, the objects can also be modeled directly as projections of such a cylinder or as a projection of such a rectangular block or directly as a rectangle. In this variant, the data output by the image sensors can contain corresponding parameters of the used modeling of the objects instead of the major axes of the ellipses and the orientation angle of the ellipse. By way of example, the parameters can be a height and a radius and also an orientation angle of a cylinder. However, they can for example also be the side lengths and the orientation angle of a rectangle.

If the sub-regions monitored by the image sensors are modeled as three-dimensional spaces with a three-dimensional coordinate system, then advantageously the objects detected by the image sensors are modeled as ellipsoids, wherein the data concerning each of the detected objects to be monitored that are output by the image sensors comprise an identification, X-, Y- and Z-coordinates of a midpoint of the ellipsoid, sizes of the major axes of the ellipsoid, two orientation angles of the ellipsoid and a velocity vector. This likewise has the advantage that the data output by the image sensors are anonymized. At the same time, however, the data output by the image sensors enable an identification of the objects and also positioning and monitoring of the velocity of the objects. Furthermore, these data output have the advantage that they allow an estimation of a size and of a position of the objects to be monitored in the space.

As a variant with respect thereto, there is also the possibility that the objects detected by the image sensors are modeled differently. By way of example, it is possible that the objects are not modeled as ellipsoids, but rather as cylinders or rectangular blocks, for example. In this variant, the data output by the image sensors can contain corresponding parameters of the used modeling of the objects instead of the major axes of the ellipsoid and the two orientation angles of the ellipsoid. By way of example, the parameters can be a height and a radius and two orientation angles of a cylinder. However, they can for example also be the side lengths and two orientation angles of a rectangular block.

As an alternative thereto, there is also the possibility that the objects detected by the image sensors are modeled differently and that the data output by the image sensors comprise different data concerning the detected objects. By way of example, the data can also comprise only a position of the detected objects. However, there is also the possibility that the data comprise information such as, for example, colors or identification codes of the detected objects.

If the data output by the image sensors relate to a one-, two- or three-dimensional coordinate system, then the coordinate systems to which the data output by the image sensors relate are advantageously rectified. In this case, the coordinate systems are preferably rectified by lens-governed curvatures of the coordinate systems being straightened. This may be the case, for example, if the image sensors used are cameras which use a wide-angle lens. However, there is also the possibility, for example, that the coordinate systems to which the data output by the image sensors relate are rectified by being adapted to the coordinate system to which the data output by one of the image sensors relate. Both have the advantage that the coordinate systems to which the data output by the image sensors relate can be compared with one another more simply in.

As a preferred variant with respect thereto, there is also the possibility that, if the data output by the image sensors relate to a one-, two- or three-dimensional coordinate system, the coordinate systems are already rectified in the corresponding image sensor, as a result of which the data output by the image sensors already relate to rectified coordinate systems. This likewise has the advantage that the coordinate systems to which the data output by the image sensors relate can be compared with one another more simply in.

As an alternative thereto, however, there is also the possibility that, if the data output by the image sensors relate to a one-, two- or three-dimensional coordinate system, the coordinate systems to which the data output by the image sensors relate are not rectified.

If the data output by the image sensors relate to a two-dimensional coordinate system and the monitoring region is modeled by a two-dimensional coordinate system, then the data output by the image sensors are preferably transferred to the two-dimensional coordinate system of the monitoring region.

If the data output by the image sensors relate to a three-dimensional coordinate system and the monitoring region is modeled by a three-dimensional coordinate system, then the data output by the image sensors are preferably transferred to the three-dimensional coordinate system of the monitoring region.

If the data output by the image sensors relate to a one-dimensional coordinate system and the monitoring region is modeled by a one-dimensional coordinate system, then the data output by the image sensors are preferably transferred to the one-dimensional coordinate system of the monitoring region.

This transfer can be effected by a conversion, for example, which takes account of an orientation and a positioning of the different image sensors in the coordinate system of the monitoring region. Accordingly, coordinate systems to which the data output by the image sensors relate can be rotated, for example. Moreover, by way of example, length units of the coordinate systems to which the data output by the image sensors relate can be converted to the coordinate system of the monitoring region.

If the data output by the image sensors relate to a two- or three-dimensional coordinate system and the monitoring region is modeled by a one-dimensional coordinate system, then the data output by the image sensors are preferably transferred to the one-dimensional coordinate system of the monitoring region.

If the data output by the image sensors relate to a three-dimensional coordinate system and the monitoring region is modeled by a one- or two-dimensional coordinate system, then the data output by the image sensors are preferably transferred to the one- or respectively two-dimensional coordinate system of the monitoring region.

In both these cases there is the possibility that upon the transfer of the data to the coordinate system of the monitoring region the data are projected onto the coordinate system of the monitoring region. If the data contain for example parameters of a modeling of the objects to be monitored, then for example the model can be projected onto the coordinate system. That means that, if the data output by the image sensors contain parameters of an ellipsoid, for example the ellipsoid is projected onto a two-dimensional coordinate system of the monitoring region. By contrast, if the data output by the image sensors contain for example parameters of an ellipsoid or of an ellipse and the monitoring region is modeled by a one-dimensional coordinate system, then for example upon the transfer of the data it is possible to take account of a linear extension of the ellipsoid or ellipse on the one-dimensional coordinate system.

If the data output by the image sensors relate to a coordinate system having fewer dimensions than the coordinate system of the monitoring region, then the data output by the image sensors are preferably transferred to the coordinate system of the monitoring region by an orientation of the coordinate systems of the image sensors being arranged spatially in the coordinate system of the monitoring region.

If the data output by the image sensors relate to a coordinate system of the respective image sensor and if the monitoring region is modeled by a two-dimensional coordinate system, then a position and an orientation of each image sensor are preferably stored and taken into account for the transfer of the data output by the image sensors to the two-dimensional coordinate system of the monitoring region.

If the data output by the image sensors relate to a coordinate system of the respective image sensor and if the monitoring region is modeled by a one- or three-dimensional coordinate system, then a position and an orientation of each image sensor are preferably stored and taken into account for the transfer of the data output by the image sensors to the one- or respectively three-dimensional coordinate system of the monitoring region.

In both of the aforementioned cases, this has the advantage that an optimum transfer of the data to be coordinate system of the monitoring region is achieved.

As a variant with respect thereto, however, there is also the possibility that, if the data output by the image sensors relate to a coordinate system of the respective image sensor and if the monitoring region is modeled by a coordinate system, a position and an orientation of the coordinate systems of the image sensors are determined in each case on the basis of features in the image data of the image sensors, wherein the position and orientation are taken into account for the transfer of the data output by the image sensors to the coordinate system of the monitoring region.

Preferably, the image sensors are mounted head first. That means that the image sensors are oriented substantially perpendicularly downward and accordingly capture images of events below the image sensors. The image sensors are therefore expediently arranged above the objects to be monitored. Mounting the image sensors head first has the advantage that the sub-regions monitored by the image sensors are monitored from above. If the sub-regions are substantially horizontal areas which can indeed have curvatures and inclinations, as a result the sub-regions are monitored from a position substantially perpendicular to their area. Accordingly, the objects to be monitored move on an area which is substantially parallel to the image plane of the image sensors. An optimum detection of positions and velocities of the objects to be monitored is made possible as a result. Moreover, this has the advantage that the objects to be monitored can move in front of one another and mutually hide one another from the perspective of the image sensors only in very few cases. If the image sensors are mounted head first and the objects to be monitored are persons, then there is a risk of persons mutually hiding one another for example primarily in edge regions of the monitored sub-regions or if an adult leans over a child. Otherwise, the persons can be monitored optimally by this arrangement of the image sensors.

As a variant with respect thereto, there is also the possibility that the image sensors are not mounted head first. By way of example, they can be oriented obliquely downward or horizontally laterally. Such an arrangement of the image sensors can also be advantageous depending on objects to be monitored and geometry of the monitoring region. This may be the case, for example, if the intention is to monitor a moving sidewalk on which there are persons or animals who or which cannot mutually overtake one another. However, this may also be the case, for example, if articles transported on a conveyor belt are intended to be monitored.

Further advantageous embodiments and combinations of features of the invention are evident from the following detailed description and the patent claims in their entirety.

BRIEF DESCRIPTION OF THE ACCOMPANYING DRAWINGS

Figure 2A:
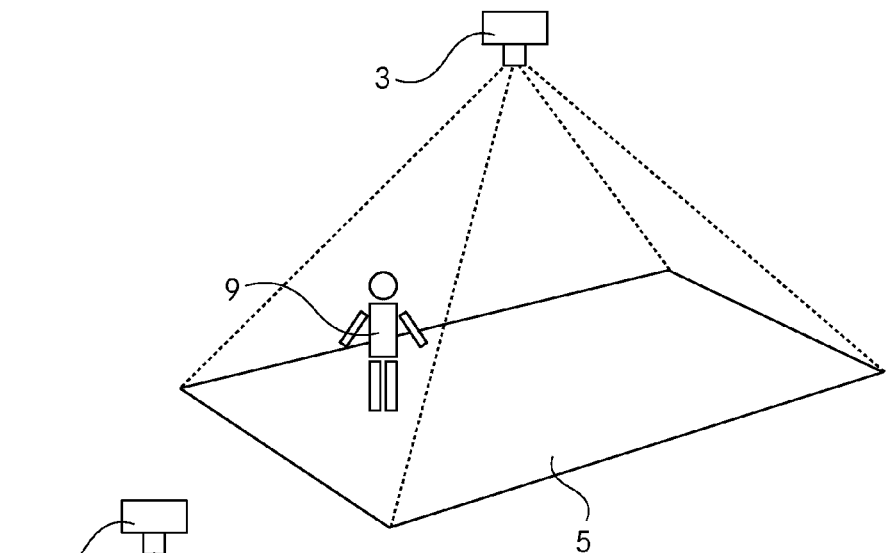
Figure 2B:
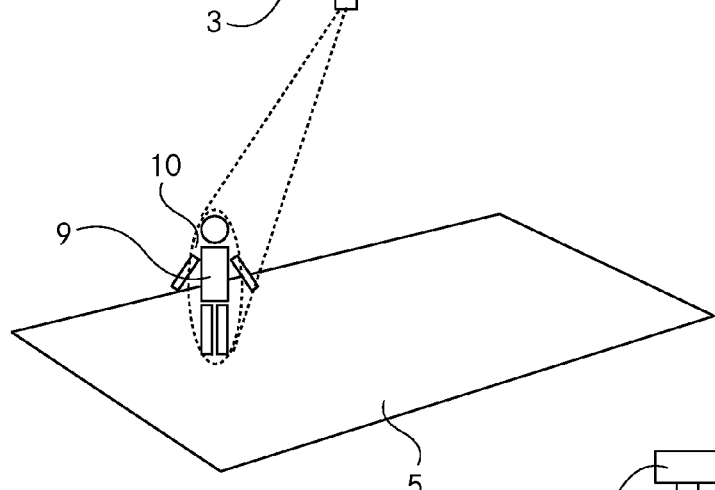
Figure 2C:
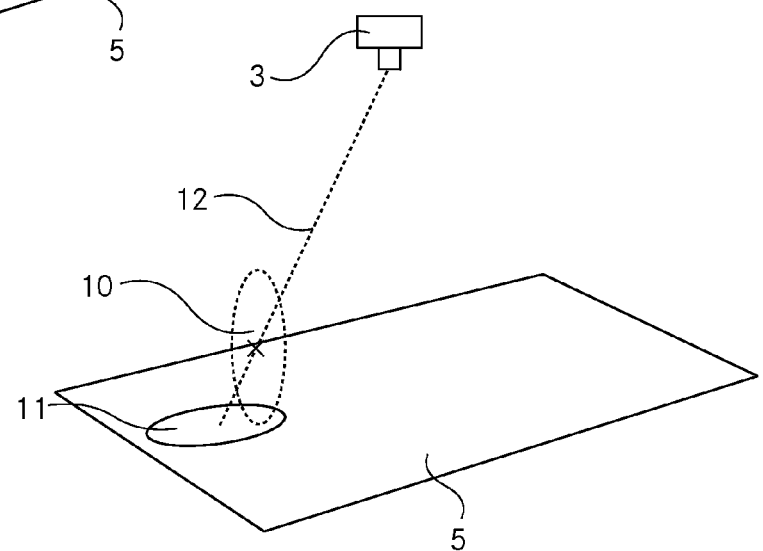
Figure 3:
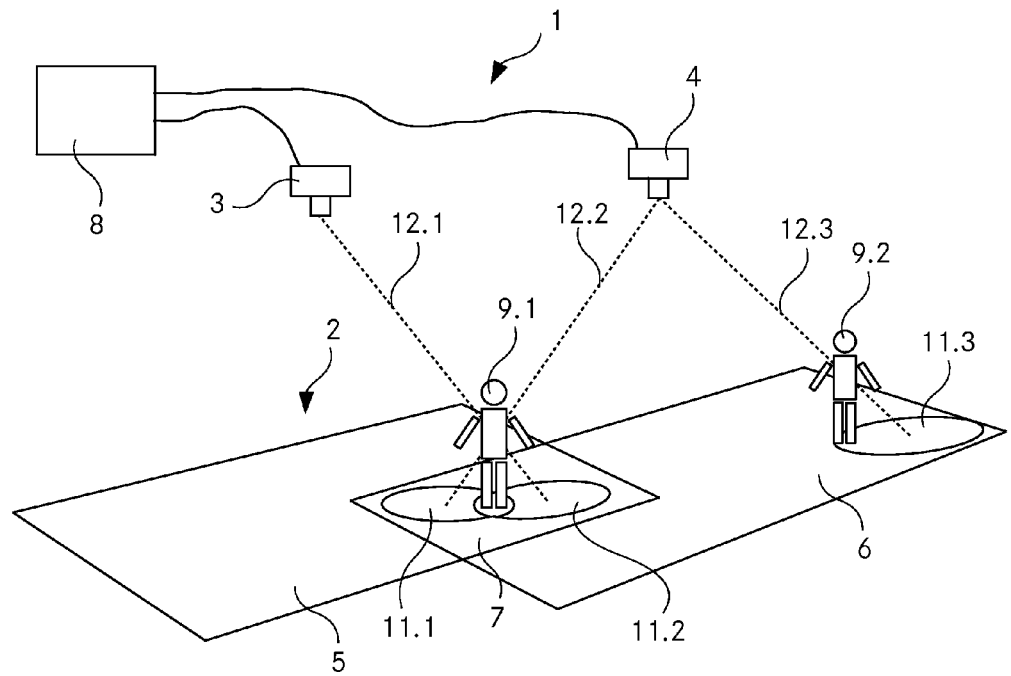
Figure 4:
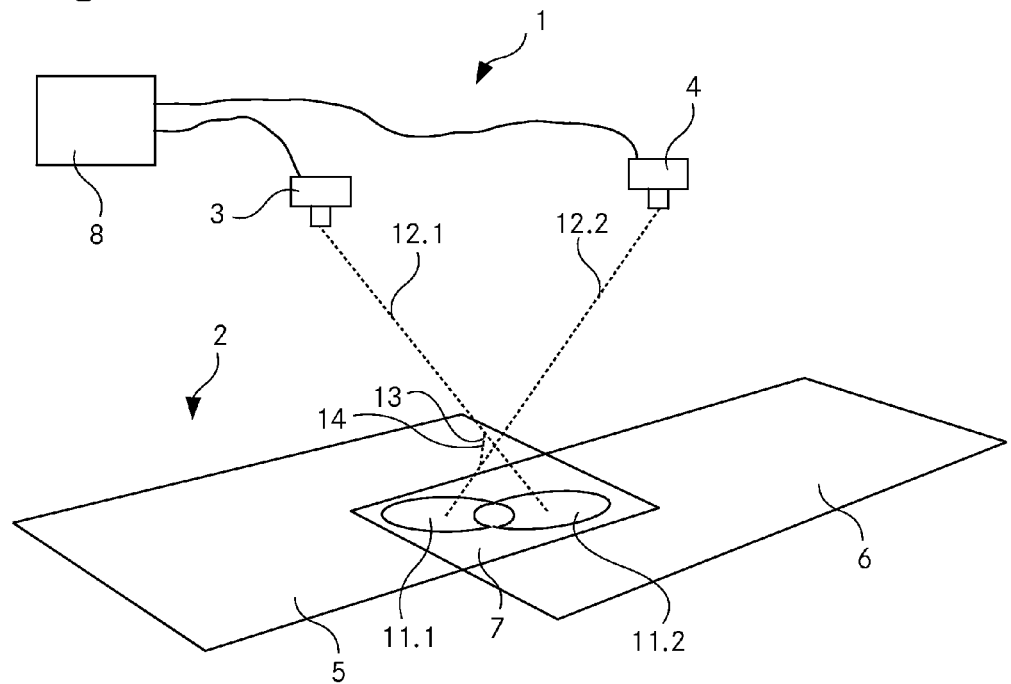

In the drawings used for elucidating the exemplary embodiment:

FIG. 1 shows a schematic illustration of a device according to the invention for monitoring a monitoring region;

FIGS. 2a, 2b and 2c each show a schematic illustration for illustrating the detection of an object to be monitored by an image sensor;

FIG. 3 shows a further schematic illustration of the device according to the invention for monitoring the monitoring region; and FIG. 4 shows a further schematic illustration of the device according to the invention for monitoring the monitoring region.

In principle, identical parts are provided with identical reference signs in the figures.

DETAILED DESCRIPTION OF THE PREFERRED EMBODIMENTS

FIG. 1 shows a schematic illustration of a device 1 according to the invention for monitoring a monitoring region 2. The device 1 comprises a first image sensor 3 and a second image sensor 4. Both first and second image sensors 3, 4 each comprise a camera which can record film sequences. The first image sensor 3 monitors a first sub-region 5 of the monitoring region 2, while the second image sensor 4 monitors a second sub-region 6 of the monitoring region 2. The two sub-regions 5, 6 overlap in an overlap region 7 and together cover the entire monitoring region 2.

Furthermore, the device 1 comprises a calculation unit 8. The calculation unit 8 can be for example a server or some other computer. The first and second image sensors 3 and 4 are connected to the calculation unit 8 and output data to the calculation unit 8. In a different embodiment, however, the calculation unit 8 can also be integrated into one of the first and second image sensors 3, 4. In this case, there is also the possibility that a plurality of the first and second image sensors 3, 4 comprise such a calculation unit 8.

The first and second image sensors 3, 4 can detect objects to be monitored within the sub-region 5, 6 monitored by the first and second image sensors 3, 4. By way of example, the objects to be monitored can be persons. However, animals, vehicles or articles can also be involved.

FIGS. 2a, 2b and 2c each show a schematic illustration for illustrating the detection of an object to be monitored by an image sensor. Hereinafter, for the image sensor shown and the sub-region shown, reference is made in each case to the first image sensor 3 and the first sub-region 5. However, this is an exemplary description which is also representative of further image sensors and further sub-regions. In particular, this description is also representative of the second image sensor 4 described above and the second sub-region 6 described above.

FIG. 2a shows the first image sensor 3 and the first sub-region 5 monitored by it. There is a person 9 in the first sub-region 5. In order to detect this person 9, the first image sensor 3 comprises a processing unit (not shown), which processes the image data recorded by the first image sensor 3. For this purpose, the processing unit identifies objects to be monitored which are thereby detected by the first image sensor 3, and outputs data concerning the detected objects to be monitored. In the present case, therefore, the data output are data concerning the person 9 situated in the first sub-region 5.

For the processing of the image data acquired by the first image sensor 3, the objects to be detected are modeled as ellipsoids in the three-dimensional space. As shown in FIG. 2b, therefore, the person 9 is modeled by an ellipsoid 10. In the case of this modeling, a projection of the ellipsoid 10 that proceeds from the first image sensor 3 onto the first sub-region 5 produces an ellipse 11 (FIG. 2c). A ray 12 which proceeds from the first image sensor 3 and which passes through the centroid or midpoint of the ellipsoid 10 also passes through the centroid or midpoint of the ellipse 11.

In order to simplify this modeling of the detected objects to be monitored, the image data acquired by the first image sensor 3 are rectified in a first step in the processing unit and the rectified image data are provided with a two-dimensional coordinate system extending over the monitored first sub-region 5. In a second step, the objects to be monitored are identified in the image data by the use of a known method for object identification. The method can be for example a method in which a still image (without any object in the monitored first sub-region 5) is in each case subtracted from the image data. In a third step, in each case an ellipse 11 is placed onto the detected objects. For this purpose, in each case lengths of the two major axes of the ellipse 11, a position of the ellipse 11 and an angle between one of the two major axes of the ellipse 11 and a coordinate axis of the first sub-region 5 are fitted to the corresponding detected object. These data concerning the detected objects are output by the processing unit and the first image sensor 3 to the calculation unit 8 (see FIG. 1), where they are processed further.

FIG. 3 shows, like FIG. 1 already, a schematic illustration of the device 1 according to the invention for monitoring the monitoring region 2. In contrast to FIG. 1, however, here there are two persons 9.1, 9.2 in the second sub-region 6. A first of these two persons 9.1 is at the same time also situated in the first sub-region 5 and thus in the overlap region 7. The person is detected both by the first and by the second image sensor 3, 4. The second person 9.2, by contrast, is situated only in the second sub-region 6 and is detected only by the second image sensor 4.

For the first person 9.1, who is detected by both image sensors 3, 4, the rays 12.1, 12.2 are shown, which rays proceeding from the respective image sensor 3, 4 pass through the centroid or midpoint of the modeled ellipsoid and of the corresponding modeled ellipse 11.1, 11.2. Moreover, the two ellipses 11.1, 11.2 detected by the two image sensors 3, 4 for the first person 9.1 are shown. The parameters of the two ellipses 11.1, 11.2 are output by the image sensors 3, 4 to the calculation unit 8.

Furthermore, for the second person 9.2, who is detected only by the second image sensor 4, the ray 12.3 is shown, which ray proceeding from the second image sensor 4 passes through the centroid or midpoint of the modeled ellipsoid and of the corresponding modeled ellipse 11.3. Furthermore, the ellipse 11.3 detected by the second image sensor 4 for the second person 9.2 is shown. The parameters of the ellipse 11.3 are output by the second image sensor 4 to the calculation unit 8.

From these data output by the first and second image sensors 3, 4, a totality of the objects to be monitored is determined by the calculation unit 8. For this purpose, in a first step, the data output by the first and second image sensors 3, 4 are converted to a two-dimensional coordinate system extending over the monitoring region 2. In a second step, a matrix is established on the basis of the converted data. The elements of the matrix contain ratings for the probability that an object detected by the first image sensor 3 corresponds to an object detected by the second image sensor 4. In the present example, these ratings are normalized to probabilities, i.e. to one. However, the ratings could also be normalized to a different value. In a third step, on the basis of the ratings contained in the matrix, the most probable assignment of the detected objects is determined and the totality of the objects to be monitored is determined. In this case, the most probable assignment is determined by the calculation unit 8 using the Hungarian method, which is also referred to as the Kuhn-Munkres algorithm.

A size of the matrix established by the calculation unit 8 depends on the number of objects detected by the first and second image sensors 3, 4. Since it may be the case that an object detected by one image sensor 3, 4 is not detected by the other image sensor 4, 3, the matrix contains a number of rows amounting to the number of objects detected by the one image sensor 3, 4 plus one. Furthermore, for this reason the matrix contains a number of columns amounting to the number of objects detected by the other image sensor 4, 3 plus one.

In the present case, with the first person 9.1, only one object to be monitored is detected by the first image sensor 3. Therefore, the matrix determined by the calculation unit 8 has two rows. By contrast, with the first and second persons 9.1, 9.2, two objects to be monitored are detected by the second image sensor 4. Accordingly, the matrix determined by the calculation unit 8 has three columns. Consequently, the matrix determined by the calculation unit 8 has the following form:

$$p_{11} p_{12} p_{13}$$

$$p_{21} p_{22} p_{23}$$

The first row of this matrix relates to ratings that the first person 9.1 detected by the first image sensor 3 corresponds to a or no person detected by the second image sensor 4. By contrast, the second row of the matrix relates to ratings that no person detected by the first image sensor 3 corresponds to a or no person detected by the second image sensor 4. The first column of the matrix relates to ratings that the first person 9.1 detected by the second image sensor 4 corresponds to a or no person detected by the first image sensor 3. The second column of the matrix relates to ratings that the second person 9.2 detected by the second image sensor 4 corresponds to a or to no person detected by the first image sensor 3. By contrast, the third column relates to ratings that no person detected by the second image sensor 4 corresponds to a or to no person detected by the first image sensor 3. Since the element $p_{23}$ thus contains the rating that no object detected by the first image sensor 3 corresponds to no object detected by the second image sensor 4, this element can be set to a fixed value. Hereinafter, this element is set to zero. However, it could also be set to any arbitrary other value.

Both the positions and the orientations of the two image sensors 3, 4 are stored in the calculation unit 8. Therefore, the calculation unit 8, on the basis of the data output by the first image sensor 3, can ascertain whether an object detected by the first image sensor 3 is situated only in the first sub-region 5, or whether it is simultaneously also situated in the second sub-region 6 and thus in the overlap region 7. In the same way, the calculation unit 8, on the basis of the data output by the second image sensor 4, can therefore ascertain whether an object detected by the second image sensor 4 is situated only in the second sub-region 6, or whether it is simultaneously also situated in the first sub-region 5 and thus in the overlap region 7.

In the example shown in FIG. 3, the first person 9.1 is situated in the overlap region 7, while the second person 9.2 is situated only in the second sub-region 6. Accordingly, the calculation unit 8 sets the rating $p_{12}$ to zero and the rating $p_{22}$ to 1:

$$p_{11} 0 p_{13}$$

$$p_{21} 1 0$$

The elements $p_{11}$, $p_{21}$ and $p_{13}$ of the matrix are determined by the calculation unit 8 by the use of boundary conditions and certain rating criteria. The boundary conditions consist of the fact that each object detected by one image sensor 3, 4 either corresponds or does not correspond to an object detected by the other image sensor 4, 3. The following boundary conditions thus result for the present matrix: $p_{11}+p_{21}=1$, $p_{12}+p_{22}=1$ and $p_{11}+p_{12}+p_{13}=1$. In the example shown in FIG. 3 with the first and second persons 9.1, 9.2 in the monitoring region 2, this means that the matrix acquires the form $$p_{11} 0 (1-p_{11})$$

$$(1-p_{11}) 1 0$$

wherein the value of the element $p_{11}$ is determined by the calculation unit 8 in accordance with the rating criteria explained further below.

In a modified case constructed in a manner similar to the case illustrated in FIG. 3, but wherein the second person 9.2 detected only by the second image sensor 4 is likewise situated in the overlap region 7, the matrix established by the calculation unit 8 turns out differently. In this case, consideration is given to the fact that one of the two persons 9.1, 9.2 detected by the second image sensor 4 could correspond to the first person 9.1 detected by the first image sensor 3. Accordingly, the matrix established by the calculation unit 8 turns out as follows:

$$p_{11} p_{12} (1-p_{11}-p_{12})$$

$$(1-p_{11})(1-p_{12}) 0$$

The values of the elements $p_{11}$ and $p_{12}$ are determined by the calculation unit 8 in accordance with the rating criteria explained below.

FIG. 4 shows, like FIGS. 1 and 3 already, a schematic illustration of the device 1 according to the invention for monitoring the monitoring region 2. In contrast to FIG. 3, no persons are illustrated. However, FIG. 4 illustrates the two ellipses 11.1, 11.2 in the overlap region 7 together with the rays 12.1, 12.2 emerging from the first and second image sensors 3, 4, the data of which in accordance with FIG. 3 for the detected first person 9.1 (not shown here) are output by the first and second image sensors 3, 4 to the calculation unit 8. FIG. 4 serves to illustrate the determination of the elements of the matrix.

As already mentioned, the elements of the matrix contain the ratings for the probability that an object detected by the first image sensor 3 corresponds to an object detected by the second image sensor 4. Various rating criteria can be used for this purpose.

By way of example, a minimum distance 13 between the rays 12.1, 12.2 proceeding from the image sensors 3, 4 can be used as a rating criterion. In this case, a minimum distance of zero (intersecting rays 12.1, 12.2) can correspond to a highest possible rating. If the ratings are expressed in probabilities, then this corresponds to a value of $p_1=1$ and all other minimum distances are rated by a lower probability. By contrast, if the ratings are expressed by means of cost ratings, then this corresponds to the value of $p_1=0$, while all other minimum distances are rated by a higher rating value.

A similarity of the sizes of the ellipses can be used as a second possible rating criterion. In this case, however, consideration should be given to the fact that the ellipses are projections of an ellipsoid. Accordingly, a distance in the plane of the monitoring region 2 relative to the respective image sensor 3, 4 can be taken into consideration for the determination of the sizes of the ellipses. In this case, a correspondence of the sizes of the ellipses with consideration of distance relative to the respective image sensor can correspond to a highest possible rating. If the ratings are expressed in probabilities, then this corresponds to a value of $p_2=1$ and all other similarities of the sizes of the ellipses are rated by a lower probability. By contrast, if the ratings are expressed by means of cost ratings, then this corresponds to the value of $p_2=0$, while all other similarities of the sizes of the ellipses are rated by a higher rating value.

A measure of similarity for the velocities of the detected objects can be used as a third possible rating criterion. This can involve for example the absolute value of the difference between the two velocity vectors. If the absolute value is zero, then the highest possible correspondence is involved. If the ratings are expressed in probabilities, then this corresponds to a value of $p_3=1$ and all other velocity differences are rated by a lower probability. By contrast, if the ratings are expressed by means of cost ratings, then this corresponds to the value of $p_3=0$, while all other velocity differences are rated by a higher rating value.

A measure which rates an expedient height of the midpoint 14 of the line of the minimum distance 13 between the rays 12.1, 12.2 proceeding from the image sensors 3, 4 can be used as a fourth possible rating criterion. In this case, the expedient height can be adapted to the objects to be monitored. In the case of adults, the expedient height can be 80-100 cm, depending on the assumption of the height of the persons.

By way of example, it is possible to take the measure as a result of the absolute value of the difference between the expedient height and the height of the midpoint 14. In this case, a value zero of the absolute value means a highest possible correspondence. If the ratings are expressed in probabilities, then this corresponds to a value of $p_4=1$ and all other heights of the midpoint 14 are rated by a lower probability. By contrast, if the ratings are expressed by means of cost ratings, then this corresponds to the value of $p_4=0$, while all other heights of the midpoint 14 are rated by a higher rating value.

A measure which takes account of the previous assignments can be used as a fifth possible rating criterion. If the image sensors 3, 4 are cameras which record film sequences, it is possible to use for this purpose for example a sum of the ratings of the correspondence of the relevant objects to be monitored during the last ten individual images recorded. In this example, a highest possible rating continuously during the last ten ratings means a highest possible rating. If the ratings are expressed in probabilities, then this corresponds to a value of $p_5=1$ and all other previous assignments are rated by a lower probability. By contrast, if the ratings are expressed by means of cost ratings, then this corresponds to the value of $p_5=0$, while all other previous assignments are rated by a higher rating value.

One of these five rating criteria mentioned above can be used in each case for determining the elements of the matrix. However, there is also the possibility that some other rating criterion, not mentioned here, is used. Moreover, there is the possibility of using more rating criteria jointly. By way of example, the matrix elements can be formed in each case from a sum of the different rating values. In this case, the different rating values of the different rating criteria can for example also be weighted differently. Relative to the rating criteria mentioned above, a matrix element $p_{ij}$ can be formed for example as follows:

$$p_{ij}=a_1 p_1+a_2 p_2+a_3 p_3+a_4 p_4+a_5 p_5$$

wherein $a_k$ in each case represents a weighting factor. If the individual ratings are probabilities normalized to 1, then the weighting factors should likewise be normalized to 1: $a_1+a_2+a_3+a_4+a_5=1$.

As already mentioned, the assignment of the objects to be monitored on the basis of the matrix is effected by the calculation unit 8 in a manner known per se, with use of the Hungarian method, also referred to as the Kuhn-Munkres algorithm. From this assignment, the totality of the objects to be monitored is determined by the calculation unit 8. The totality of the objects to be monitored can in turn be output by the calculation unit 8. For this purpose, by way of example, it is possible to represent the monitored objects as points in the monitoring region 2 on a screen (not shown). However, there is also the possibility that the totality of the objects to be monitored is output only in the form of numbers. By way of example, the calculation unit 8 can be connected to a further computer, which evaluates the temporal profile of the number of objects to be monitored. However, the further computer can for example also record the movements of the objects and issue congestion warnings if objects accumulate in a region of the monitoring region 2. These possibilities for using the totality of the objects to be monitored output by the calculation unit 8 are not exhaustive. The data of the totality output can be used as necessary. Moreover, the device 1 described above can be adapted according to the specific requirements.

The device 1 described above is not the only embodiment according to the invention. Diverse modifications of the device 1 are possible. By way of example, there is the possibility that the objects to be monitored are modeled by the image sensors not as ellipsoids, but rather differently. Furthermore, there is the possibility that the data output by the image sensors contain only the positions of the detected objects or only parameters concerning rays proceeding from the respective image sensor to the respective detected object. In this case, there is the possibility that the data acquisition of the image sensors takes place in three steps substantially as described above in association with FIG. 2c. From the data acquired in this way, for a detected object, for example, it is possible that in each case only the position of the midpoint of the ellipse is output by the processing unit and the corresponding image sensor to the calculation unit. However, there is also the possibility that in each case only data concerning a ray proceeding from the corresponding image sensor through the midpoint of the ellipse are output by the image sensors. As a variant, however, there is also the possibility of fitting some other shape to the detected object. By way of example, this can be a circle or a rectangle.

In order to enable an optimum determination of the positions of the objects to be monitored, it is possible to assume for example a height for the centroid of the objects to be monitored. In this case, it is possible to calculate a point of intersection between a ray which proceeds from the respective image sensor and points toward the detected object and a plane arranged at the assumed height of the centroid above the ground. The point of intersection determined in this way can be used as the position of the corresponding object. Such a position determination is possible even if an object to be monitored is detected only by one image sensor.

In this procedure for position determination there is the possibility that a fixed value is assumed as a value for the height of the centroid. However, there is also the possibility that in the totality of the objects to be monitored an individual value for the height of the centroid is stored for each object. If an object is newly included in the totality of the objects to be monitored, it is possible here to use a pre-defined value which corresponds approximately to the height of the centroid of the objects to be monitored. If the object moves into an overlap region in which it is detected by more than one image sensor, the stored value of the height of the centroid can be adapted by concomitant consideration of the height of the midpoint of the line of the minimum distance between the rays proceeding from the image sensors. In this context, by way of example, the value of the height of the midpoint of the line of the minimum distance can in each case be stored directly as the height of the centroid. However, there is also the possibility that, upon repeated movement of an object into an overlap region, an average value of the previously determined values of the height of the centroid is stored. This last makes it possible to take account of a plurality of determinations of the height of the centroid, as a result of which a more accurate determination of the height of the centroid is made possible. This leads to a more accurate position determination of the objects to be monitored, since the rays proceeding from an image sensor and passing to the detected object can run in a greatly inclined fashion if there is an object in the edge region of a sub-region. Accordingly, even small deviations in the height of the centroid can lead to considerable position deviations.

To summarize it can be stated that a method associated with the technical field mentioned in the introduction and a corresponding device are provided which enable an improved determination of the totality of the objects to be monitored in the monitoring region from the data of the image sensors.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A method for monitoring a monitoring region with at least two image sensors, wherein
   a) a sub-region of the monitoring region is monitored by each of said at least two image sensors by virtue of the fact that each of said at least two image sensors detects objects to be monitored that are localized within said sub-region monitored by a respective one of said at least two image sensors and data concerning the detected objects are output by each of said at least two image sensors in an anonymized fashion;
   b) said at least two image sensors are arranged and oriented in such a way that said monitored sub-regions overlap and that each of said objects to be monitored which is situated in the monitoring region is always detected by at least one of said at least two image sensors; and
   c) a totality of said objects to be monitored in the monitoring region is determined from the data of said at least two image sensors;
   wherein
   d) on the basis of the data of said at least two image sensors said objects to be monitored in said overlapping sub-regions which are detected by more than one of said at least two image sensors are assigned to one another by means of a rating of their correspondence in order to determine the totality of said objects to be monitored in the monitoring region;
   wherein the data output by said at least two image sensors each detected object is represented by a parameterized model;
   wherein a value calculated from a minimum distance between a ray proceeding from one of said at least two image sensors through a centroid of the parameterized model and a ray proceeding from another of said at least two image sensors through a centroid of the parameterized model is in each case taken into account for the rating of the correspondence;

wherein for each object to be monitored in the totality of the objects to be monitored a height of the centroid of the corresponding object is stored, wherein initially an expedient height is assumed as a value of said height and the value of said height is dynamically adapted by virtue of the fact that upon an assignment of objects to be monitored, in which the corresponding object to be monitored is detected by at least two of said at least two image sensors, a height of the centroid of said object is determined by virtue of the fact that a height of a midpoint of a shortest connecting line between a ray proceeding from one of said at least two image sensors through the centroid of the parameterized model detected by said one of said at least two image sensors and a ray proceeding from the other of said at least two image sensors through the centroid of the parameterized model detected by said other of said at least two image sensors is determined.

2. A method for monitoring a monitoring region with at least two image sensors, wherein
  a) a sub-region of the monitoring region is monitored by each of said at least two image sensors by virtue of the fact that each of said at least two image sensors detects objects to be monitored that are localized within said sub-region monitored by a respective one of said at least two image sensors and data concerning the detected objects are output by each of said at least two image sensors in an anonymized fashion;
  b) said at least two image sensors are arranged and oriented in such a way that said monitored sub-regions overlap and that each of said objects to be monitored which is situated in the monitoring region is always detected by at least one of said at least two image sensors; and
  c) a totality of said objects to be monitored in the monitoring region is determined from the data of said at least two image sensors;
wherein
  d) on the basis of the data of said at least two image sensors said objects to be monitored in said overlapping sub-regions which are detected by more than one of said at least two image sensors are assigned to one another by means of a rating of their correspondence in order to determine the totality of said objects to be monitored in the monitoring region;
wherein the data output by said at least two image sensors each detected object is represented by a parameterized model;
wherein the rating of the correspondence takes account of whether a midpoint of a shortest connecting line between the ray proceeding from one of said at least two image sensors through the centroid of the parameterized model detected by said one of said at least two image sensors and the ray proceeding from the other of said at least two image sensors through the centroid of the parameterized model detected by said other of said at least two image sensors is situated at an expedient height for a height of a centroid of the objects to be monitored.

3. A method for monitoring a monitoring region with at least two image sensors, wherein
  a) a sub-region of the monitoring region is monitored by each of said at least two image sensors by virtue of the fact that each of said at least two image sensors detects objects to be monitored that are localized within said sub-region monitored by a respective one of said at least two image sensors and data concerning the detected objects are output by each of said at least two image sensors in an anonymized fashion;
  b) said at least two image sensors are arranged and oriented in such a way that said monitored sub-regions overlap and that each of said objects to be monitored which is situated in the monitoring region is always detected by at least one of said at least two image sensors; and
  c) a totality of said objects to be monitored in the monitoring region is determined from the data of said at least two image sensors;
wherein
  d) on the basis of the data of said at least two image sensors said objects to be monitored in said overlapping sub-regions which are detected by more than one of said at least two image sensors are assigned to one another by means of a rating of their correspondence in order to determine the totality of said objects to be monitored in the monitoring region;
wherein the data output by said at least two image sensors each detected object is represented by a parameterized model;
wherein a value calculated from a minimum distance between a ray proceeding from one of said at least two image sensors through a centroid of the parameterized model and a ray proceeding from another of said at least two image sensors through a centroid of the parameterized model is in each case taken into account for the rating of the correspondence;
wherein for each object to be monitored in the totality of the objects to be monitored a height of the centroid of the corresponding object is stored, wherein initially an expedient height is assumed as a value of said height and the value of said height is dynamically adapted by virtue of the fact that upon an assignment of objects to be monitored, in which the corresponding object to be monitored is detected by at least two of said at least two image sensors, a height of the centroid of said object is determined by virtue of the fact that a height of a midpoint of a shortest connecting line between a ray proceeding from one of said at least two image sensors through the centroid of the parameterized model detected by said one of said at least two image sensors and a ray proceeding from the other of said at least two image sensors through the centroid of the parameterized model detected by said other of said at least two image sensors is determined;
wherein the objects detected by said at least two image sensors are modeled as ellipsoids whose projection onto the two-dimensional area of the corresponding sub-region produce an ellipse, and in that the data concerning each of the detected objects to be monitored that are output by said at least two image sensors comprise an identification, x- and y-coordinates of a midpoint of the ellipse, sizes of the major axes of the ellipse, an orientation angle of the ellipse and a velocity vector.

* * * * *